United States Patent
Martin

(10) Patent No.: US 9,722,499 B2
(45) Date of Patent: Aug. 1, 2017

(54) ENERGY TRANSFER ELEMENT WITH CAPACITOR COMPENSATED CANCELLATION AND BALANCE SHIELD WINDINGS

(71) Applicant: Power Integrations, Inc., San Jose, CA (US)

(72) Inventor: Robert A. Martin, San Jose, CA (US)

(73) Assignee: Power Integrations, Inc., San Jose, CA (US)

( * ) Notice: Subject to any disclaimer, the term of this patent is extended or adjusted under 35 U.S.C. 154(b) by 0 days.

(21) Appl. No.: 14/962,903

(22) Filed: Dec. 8, 2015

(65) Prior Publication Data

US 2017/0163164 A1    Jun. 8, 2017

(51) Int. Cl.
   *H02M 3/335*    (2006.01)
   *H02M 1/44*    (2007.01)

(52) U.S. Cl.
   CPC ......... *H02M 3/33592* (2013.01); *H02M 1/44* (2013.01)

(58) Field of Classification Search
   CPC .............................. H02M 3/33592; H02M 1/44
   See application file for complete search history.

(56) References Cited

U.S. PATENT DOCUMENTS

| 4,507,721 | A | * | 3/1985 | Yamano | H02M 3/335 363/20 |
| 5,150,046 | A | * | 9/1992 | Lim | H01F 27/362 323/356 |
| 6,549,431 | B2 | * | 4/2003 | Odell | H01F 27/34 363/21.12 |
| 6,995,990 | B2 | * | 2/2006 | Odell | H01F 27/34 363/21.12 |
| 2010/0109832 | A1 | * | 5/2010 | Espino | H01F 27/38 336/84 C |

FOREIGN PATENT DOCUMENTS

CN    202013796 U    * 10/2011

* cited by examiner

*Primary Examiner* — Jue Zhang
(74) *Attorney, Agent, or Firm* — Christensen O'Connor Johnson Kindness PLLC

(57) ABSTRACT

Energy transfer element circuitry for use in a power converter includes a cancellation shield winding wound around an energy transfer element core. A first trimming capacitor is coupled to a first end of the cancellation shield winding to adjust a shield response of the cancellation shield winding. A second end of the cancellation shield winding is unconnected. A primary winding is wound around the energy transfer element core. A balance shield winding is wound around the energy transfer element core. A second trimming capacitor is coupled to a second end of the balance shield winding to adjust a shield response of the cancellation shield winding. A first end of the balance shield winding is unconnected. A secondary winding is wound around the energy transfer element core.

19 Claims, 3 Drawing Sheets

ENERGY TRANSFER ELEMENT WITH CAPACITOR COMPENSATED CANCELLATION AND BALANCE SHIELD WINDINGS

BACKGROUND INFORMATION

Field of the Disclosure

The present invention relates generally to power converters, and more specifically to transformers that can reduce the effects of electromagnetic interference (EMI).

Background

Electronic devices use power to operate. Switched mode power converters are commonly used due to their high efficiency, small size and low weight to power many of today's electronics. Conventional wall sockets provide a high voltage alternating current. In a switch mode power converter, a high voltage alternating current (ac) input is converted to provide a well-regulated direct current (dc) output through an energy transfer element. One example of a switch mode power converter is a flyback converter, which uses a transformer to transfer energy from an input winding to an output winding.

During the normal operation of the flyback converter, the voltages across both input and output windings of the transformer transition in accordance with the standard flyback power supply operation. These transitions generate displacement currents in the electrical earth through various parasitic capacitances. These displacement currents are detected as common mode noise and are measured by a piece of test equipment called a Line Input Stabilization Network (LISN).

One way to reduce common mode noise is the use of a Y-capacitor. The Y-capacitor provides a low impedance path for displacement currents flowing between the input and output windings of the transformer to return to their source without flowing through the electrical earth. The currents of the Y-capacitor are not detected by the LISN and therefore act to reduce common mode noise.

However, a power supply design may limit the Y-capacitor to a small value or no Y-capacitor at all. One way to reduce common mode noise with a smaller Y-capacitor is through the use of one or more additional windings that can reduce the capacitive displacement current between the transformer input winding and output winding by balancing the relative electrostatic fields generated by all windings with the transformer relative electrical earth through the selection of the physical position and number of turns in additional windings. However, the effectiveness of the additional windings can be limited due to the mechanical constraints such as bobbin size, or the number of wound turns due to the wire gauge.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
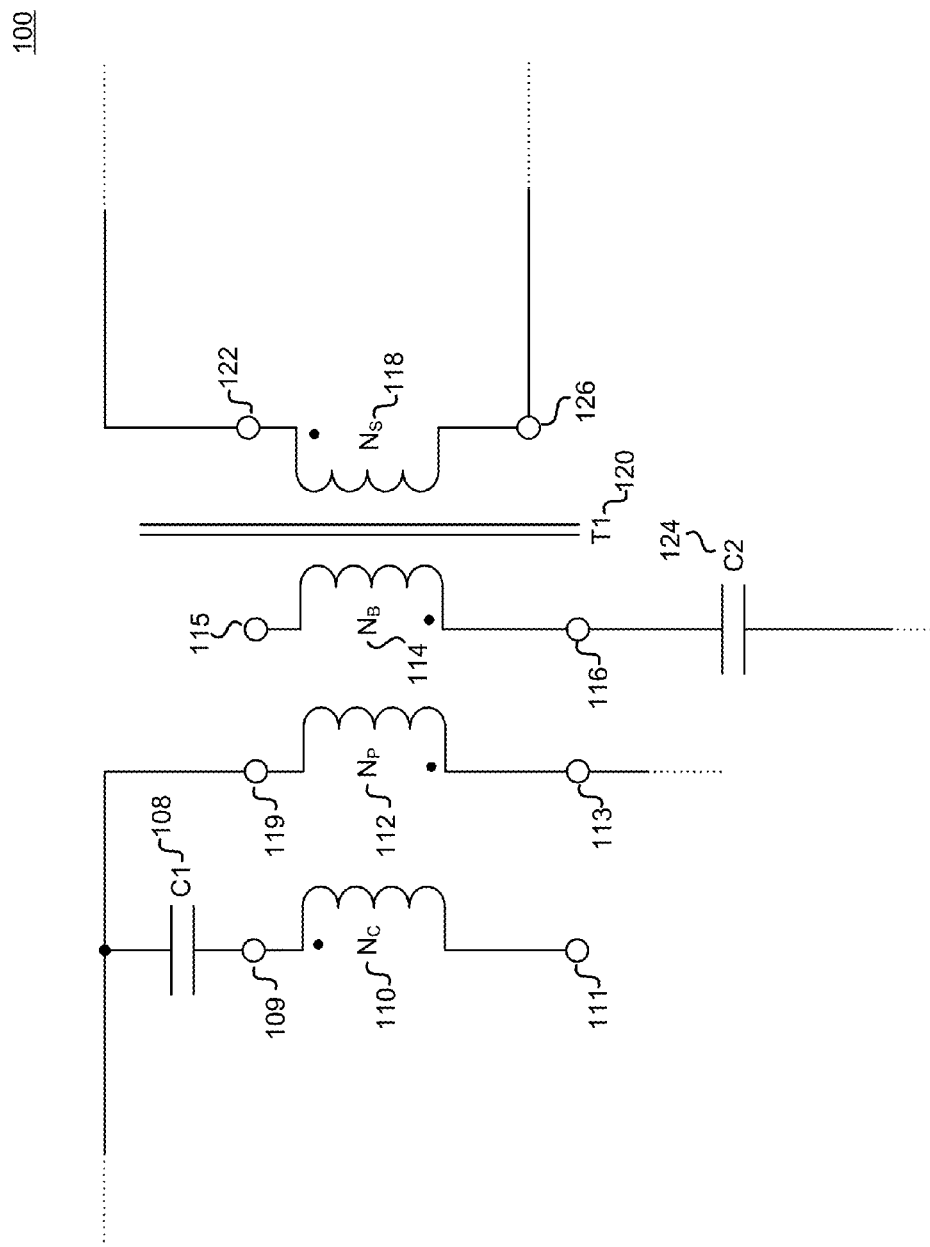
FIG. 1 is a block diagram illustrating one example of a capacitor compensated balance shield winding and capacitor compensated cancellation shield windings included in energy transfer element circuitry, in accordance with the teachings of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Examples of energy transfer element circuitry providing suppressed EMI with capacitor compensated cancellation and balance shield windings in power converters are described herein. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

As will be discussed, energy transfer element circuitry including capacitor compensated cancellation and capacitor compensated balance shield windings for use in a power converter is disclosed. In one example, the energy transfer element circuitry includes a transformer that includes a capacitor compensated cancellation shield winding, a primary winding, a capacitor compensated balance shield winding, and a secondary shield winding. An example transformer in accordance with the teachings of the present invention reduces common mode noise with capacitor compensated cancellation and balance shield windings without the need to change the size of the bobbin. For instance, in one example, a first trimming capacitor is coupled to one terminal of the cancellation shield winding, and the second terminal of the cancellation shield winding is unconnected. By adding the first trimming capacitor to one end of the cancellation shield winding, the shield response of the cancellation shield winding is adjusted or trimmed, similar to adding or reducing a turn of the cancellation shield winding. A second trimming capacitor is further coupled to one terminal of the balance shield winding, and the second terminal of the balance shield winding is unconnected. By adding the second trimming capacitor to one end of the balance shield winding, the shield response of the balance shield winding is adjusted or trimmed, it is similar to adding or reducing a turn of the balance shield winding. Thus, common mode noise and electromagnetic interference (EMI) are suppressed without the need for changing the size of the bobbin. In addition, filter components such as a common mode choke and Y-capacitor can be avoided or reduced in size in accordance with the teachings of the present invention.

To illustrate, FIG. 1 is a block diagram illustrating one example of a capacitor compensated balance shield winding and capacitor compensated cancellation shield windings in energy transfer element circuitry, which is exemplified in FIG. 1 with a transformer 100, in accordance with the teachings of the present disclosure. As shown in the depicted example, transformer 100 includes a cancellation shield winding 110, a primary winding 112, a balance shield winding 114, and a secondary winding 118. The cancellation shield winding 110 includes of a first terminal 109 and a second terminal 111, and the bias winding 114 includes a first terminal 115 and a second terminal 116. In one example, a first trimming capacitor C1 108 is coupled to the first terminal 109 of the cancellation shield winding 110, and the second terminal 111 of cancellation shield winding 110 is left unconnected. In the illustrated example, the other end of first trimming capacitor C1 108 is connected to a quiet node.

A quiet node is a node where a minority or small portion of the voltage transitions may occur. Some examples of locations of quiet nodes could be the positive rail of a bulk capacitor (not shown), the negative rail of a bulk capacitor, the positive input voltage of a power converter, the positive output of the rectifier on the input side of the power converter, or the negative rail of the secondary side of the transformer, or the quiet node of the secondary winding. In contrast, a noisy node is where the majority or a large portion of the voltage transitions may occur, and may be a contributor to common mode noise. Examples of sources of common mode noise include the drain of the power switch on the primary side of the transformer for a flyback converter, the source of the power switch on the primary side of the transformer for a high-side flyback converter, or the rectifying diode or synchronous rectifier on the secondary side of the transformer.

A second trimming capacitor C2 124 is coupled to the second terminal 116 of the balance shield winding 114, and the first terminal 115 of balance shield winding 114 is left unconnected. In one example, the other end of second trimming capacitor C2 124 is coupled to a second input supply rail (not shown), which in one example may be an input return of a power converter.

The purpose of the cancellation winding $N_C$ 110 is to cancel the net effect of the influence of the electrostatic fields produced by the other windings in the transformer construction by creating an electrostatic field that opposes it. As such, the displacement currents between the transformer windings and the transformer core are theoretically zero. The purpose of the balance winding $N_B$ 114 is to balance the electrostatic fields generated between the primary winding $N_P$ 112 and the secondary winding $N_S$ 118. The number of turns of the balance shield winding is selected such that the net electrostatic field from the combination of the balance shield $N_B$ 114 windings and input windings matches that generated by the output winding.

In the example shown in FIG. 1 illustrates the addition of first trimming capacitor C1 108, which enables the shield effect of the cancellation shield winding 110 to be adjusted or trimmed to enhance the effect of the cancellation shield winding 110, similar to adding or subtracting another turn when optimizing the shield response to suppress EMI. Similarly, the example shown in FIG. 1 also illustrates the addition of second trimming capacitor C2 124, which enables the shield effect of the balance shield winding 114 to be adjusted or trimmed to enhance the effect of the balance shield winding 114 by adding or subtracting another turn when optimizing the shield response to suppress EMI. By enhancing the effects of the cancellation shield winding 110 and the balance shield winding 114 with first trimming capacitor C1 108 and second trimming capacitor C2 124, the size of the bobbin does not need to be changed in order to accommodate additional windings in accordance with the teachings of the present invention.

Figure 2:
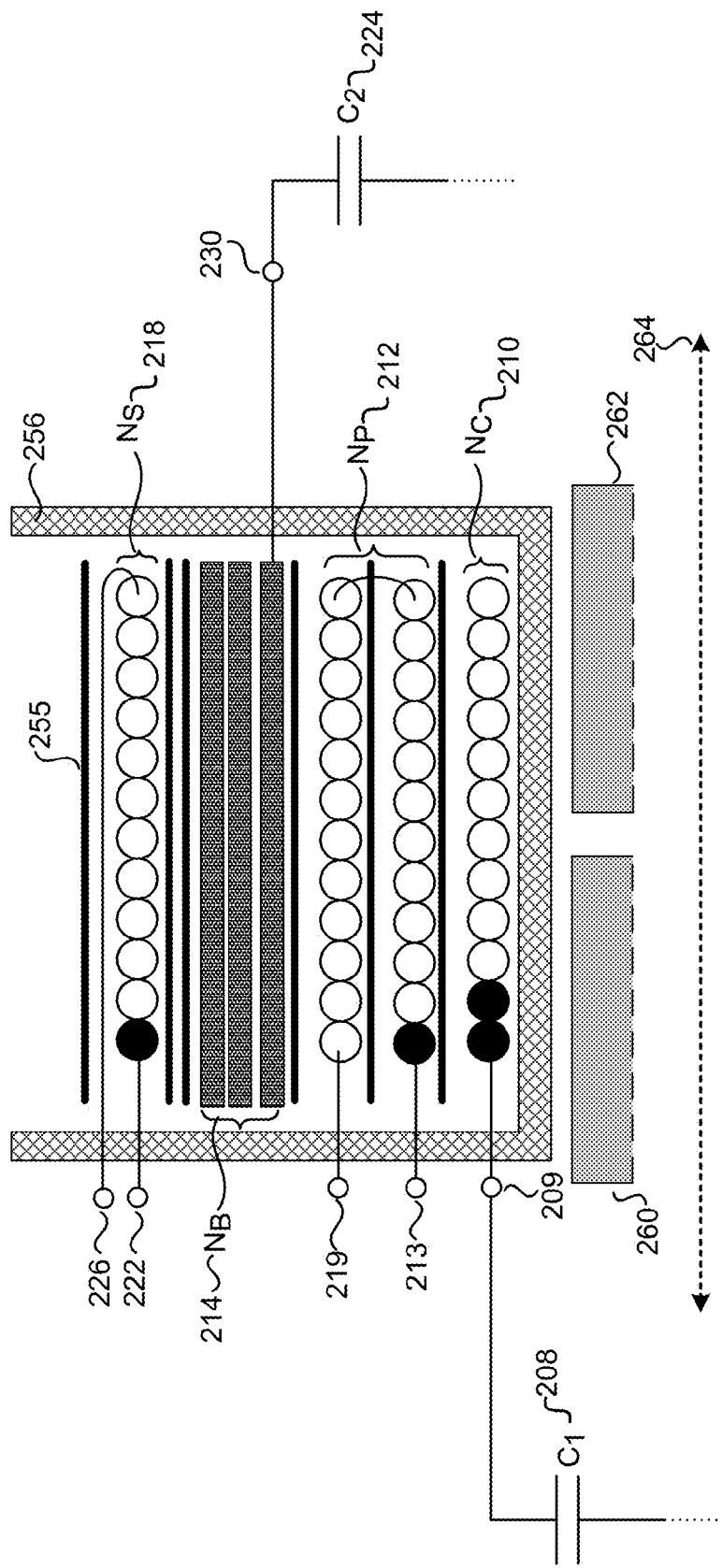
FIG. 2 is a cross section of one embodiment of a bobbin of an energy transfer element with a capacitor compensated balance shield winding, a capacitor compensated cancellation shield winding, a primary winding, and a secondary winding, in accordance with the teachings of the present disclosure.

FIG. 2 is a cross section of one embodiment of a bobbin included in an energy transfer element, such as the transformer 100 of FIG. 1, with a balance shield winding, cancellation shield winding, primary winding, and secondary winding wound in a bobbin around a core of the energy transfer element, in accordance with the teachings of the present disclosure. It is appreciated therefore that the example depicted in FIG. 2 may be one of example of that illustrated in FIG. 1, and that similarly named and numbered elements referenced below are coupled and function similar to as described above.

In particular, the example illustrated in FIG. 2 shows a bobbin 256, balance shield winding $N_B$ 214, cancellation shield winding $N_C$ 210, primary winding $N_P$ 212, and secondary winding $N_S$ 218 wound in a bobbin 256. The bobbin 256 generally includes an opening into which the core may be inserted so that the windings can encircle the core around an axis 264. In the illustrated example, the core has a first portion 260 and a second portion 262, which are inserted into the opening of the bobbin 256 from opposite ends. The area around the bobbin 256 where the windings are wound is often referred to as the bobbin window.

The bottom-most layer represents the cancellation shield winding $N_C$ 210 wound around the bobbin 256, and includes the coupling of terminal 209 to the first trimming capacitor C1 208. In another example, cancellation shield winding $N_C$ 210 may be wound by copper foil. In one example, the other end of first trimming capacitor C1 208 is coupled to a first input supply rail (not shown), which in one example may be an input voltage of a power converter, or an output of a rectifier on the input side of the power converter, or any location of a quiet node as mentioned previously.

The next two layers above represent the primary winding $N_P$ 212. In one example, the primary winding $N_P$ 212 is wound around the bobbin 256 over cancellation shield winding $N_C$ 210, and may consist of more than one layer. Configurations can include a split winding such as C winding or Z winding. The next layer above represents the balance shield winding $N_B$ 214 wound around bobbin 256, and includes the coupling of terminal 230 to the second trimming capacitor C2 224. In one example, the other end of second trimming capacitor C2 224 is coupled to a second input supply rail (not shown), which in one example may be an input return of a power converter, or any locations of a quiet node as mentioned previously. In the illustrated example, the balance shield winding $N_B$ 214 is wound by copper foil over the primary winding $N_P$ 212. In this example, the three layers of copper foil of the balance shield winding $N_B$ 214 may indicate the number of turns of the copper foil. In another example, balance shield winding $N_B$ 214 may be wound by magnet wire.

The last layer represents the secondary winding $N_S$ 218 wound around bobbin 256. In one example, the layer of secondary winding $N_S$ 218 is wound over the balance shield winding $N_B$ 214. As shown in the depicted example, in one example, each layer of windings are separated from each other with tape layers 255.

The effectiveness of the cancellation shield winding $N_C$ 210 is improved with first trimming capacitor C1 208 in spite of the mechanical constraints such as the bobbin size, or not having any more turns for a particular layer. The first trimming capacitor C1 208 shown in FIG. 2 is coupled to the terminal 209 in a similar configuration as FIG. 1. The coupling of first trimming capacitor C1 208 enables the shield effect of the cancellation shield winding $N_C$ 210 to be adjusted or trimmed, similar to adding or subtracting another turn to enhance the effect of the cancellation shield winding $N_C$ 210 when optimizing the shield response and suppressing EMI. One value of the first trimming capacitor C1 208 could be 1 nF. However, in other examples, it is appreciated that other values may be used depending on the design in accordance with the teachings of the present invention.

The effectiveness of the balance shield winding $N_B$ 214 is improved with second trimming capacitor C2 224 in spite of the mechanical constraints such as the bobbin size, or not having any more available turns for a particular layer. The second trimming capacitor C2 224 is coupled to the terminal 230 in a similar configuration as FIG. 1. The coupling of second trimming capacitor C2 224 enables the shield effect of the balance shield winding $N_B$ 214 to be adjusted or trimmed, similar to adding or subtracting another turn to enhance the effect of the balance shield winding $N_B$ 214 when optimizing the shield response and suppressing EMI. One value of the second trimming capacitor C2 224 could be 2.2 nF. However, in other examples, it is appreciated that other values may be used depending on the design in accordance with the teachings of the present invention.

Figure 3:
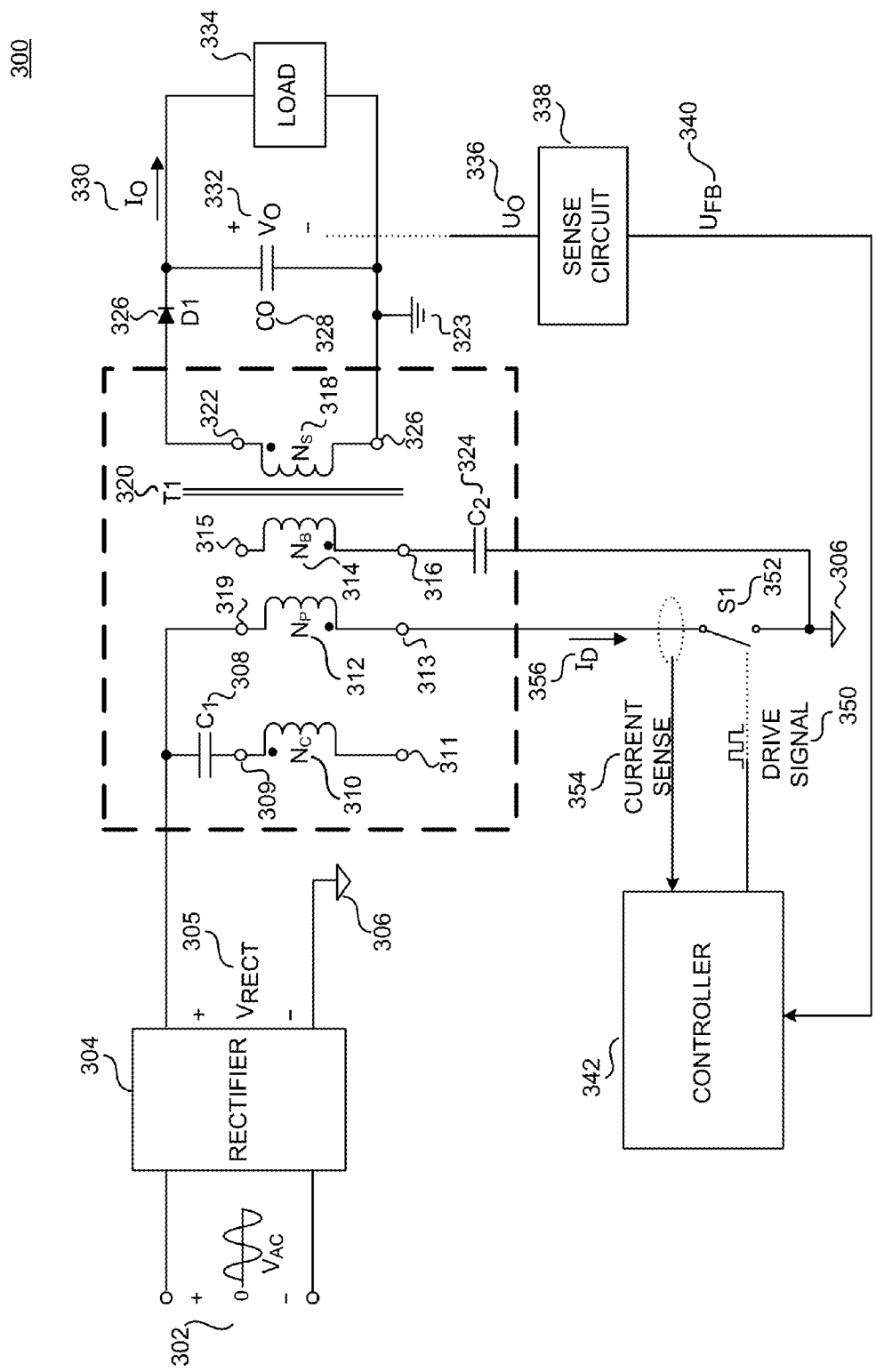
FIG. 3 is a functional block diagram of one example of a power converter including energy transfer element circuitry with a capacitor compensated balance shield winding and capacitor compensated cancellation shield windings, in accordance with the teachings of the present disclosure.

FIG. 3 is a functional block diagram of one example of a power converter 300 including energy transfer element circuitry, which in the example depicted in FIG. 3 is shown in the dashed lines, with a capacitor compensated balance shield winding and capacitor compensated cancellation shield windings, in accordance with the teachings of the present disclosure. In particular, FIG. 3 shows example power converter 300, ac input voltage $V_{AC}$ 302, an input rectifier 304, a rectified voltage $V_{RECT}$ 305, an energy transfer element T1 320, a primary winding $N_P$ 312 of the energy transfer element T1 320, a secondary winding $N_S$ 318 of the energy transfer element T1 320, a cancellation shield winding $N_C$ 310 coupled to a first trimming capacitor C1 308, a balance shield winding $N_B$ 314 coupled to a second trimming capacitor C2 324, a switch S1 352, input return 306, an output rectifier D1 326, an output capacitor $C_O$ 328, a load 334, a sense circuit 338, and a controller 342. As shown in the example depicted in FIG. 3, the cancellation shield winding $N_C$ 310 includes terminals 309 and 311. Terminal 309 of the cancellation shield winding $N_C$ 310 is coupled to first trimming capacitor C1 308. Terminal 311 is unconnected. The other end of first trimming capacitor C1 308 is coupled to a first input supply rail, which in the depicted example is the "+" terminal of rectifier 304. In another example, the first input supply rail is an input voltage of power converter 300. The primary winding $N_P$ 312 includes terminals 319 and 313. Terminal 313 is coupled to end one of switch S1 352. Terminal 319 is coupled to the first input supply rail. The balance shield winding $N_B$ 314 includes terminals 315 and 316. Terminal 316 is coupled to a second trimming capacitor C2 324. Terminal 315 is unconnected. The other end of second trimming capacitor C2 324 is coupled to a second input supply rail, which in the depicted example is the input return 306, which in the depicted example is also coupled to the "−" terminal of rectifier 304. The other end of switch S1 352 is also coupled to the second input supply rail.

In operation, the addition of first trimming capacitor C1 308 enables the shield effect of the cancellation shield winding 310 to be adjusted or trimmed, similar to adding or subtracting another turn to enhance the effect of the cancellation shield winding 310 when optimizing the shield response and suppressing EMI. Similarly, the addition of second trimming capacitor C2 324 enables the shield effect of the balance shield winding 314 to be adjusted or trimmed, similar to adding or subtracting another turn to enhance the effect of the balance shield winding 314 when optimizing the shield response and suppressing EMI. By enhancing the effects of the cancellation shield winding 310 and the balance shield winding 314 with first trimming capacitor C1 308 and second trimming capacitor C2 324, a different size bobbin to accommodate additional windings is no longer required with additional energy transfer element circuitry in accordance with the teachings of the present invention. In addition, a Y-capacitor and additional filter components such as a common mode choke can be avoided or reduced in size depending on the power supply design.

FIG. 3 further illustrates an output voltage $V_O$ 332, an output current $I_O$ 330, an output quantity $U_O$ 336, and a feedback signal $U_{FB}$ 340. The example switched mode power converter 300 illustrated in FIG. 3 is coupled in a flyback configuration, which is just one example topology of a switched mode power converter that may benefit from the teachings of the present invention. An isolated power converter, such as the flyback converter shown in FIG. 3, includes galvanic isolation, which prevents dc current from flowing the between the input and output of the power supply. It is appreciated that other known topologies and configurations of switched mode power converters may also benefit from the teachings of the present invention. In addition, it is appreciated that non-isolated power converters may also benefit from the teachings of the present invention.

The example power converter 300 illustrated in FIG. 3 provides output power to the load 334 from an unregulated input voltage. In one embodiment, the input voltage is the ac input voltage $V_{AC}$ 302. In another embodiment, the input voltage is a rectified ac input voltage such as rectified voltage $V_{RECT}$ 305. The input rectifier 304 outputs rectified voltage $V_{RECT}$ 305. In one embodiment, rectifier 304 may be a bridge rectifier. The rectifier 304 is coupled to the energy transfer element T1 320.

In some embodiments of the present invention, the energy transfer element T1 320 may be a coupled inductor. In other embodiments, the energy transfer element T1 320 may be a transformer. In a further example, the energy transfer element 320 may be an inductor. In the example of FIG. 3, the energy transfer element T1 320 includes four windings, a primary winding $N_P$ 312, a cancellation shield winding $N_C$ 310, a balance shield winding $N_B$ 314, and a secondary winding $N_S$ 318. However, it should be appreciated that the energy transfer element T1 320 may have additional windings. In the example of FIG. 3, primary winding $N_P$ 312 may be considered an input winding, and secondary winding $N_S$ 318 may be considered an output winding. The primary winding $N_P$ 312 is further coupled to switch S1 352, which is then further coupled to input return 306.

FIG. 3 also shows that energy transfer element T1 320 further includes a secondary winding $N_S$ 318, which includes terminals 322 and 326. In the example, terminal 322 is coupled to the output rectifier D1 326 and terminal 326 is coupled to an output return 323. In the example of FIG. 3, the output rectifier D1 326 is exemplified as a diode. However, in some embodiments, the rectifier D1 326 may be a transistor used as a synchronous rectifier. Both the output capacitor CO 328 and the load 334 are shown in FIG. 3 as being coupled to the output rectifier D1 326. The output capacitor CO 328 and the load 334 are also coupled to the output return 323. An output is provided to the load 334 and may be provided as either a regulated output voltage $V_O$ 332, regulated output current $I_O$ 330, or a combination of the two, which is exemplified as output quantity $U_O$ 336.

The example power converter 330 illustrated in FIG. 3 further includes circuitry to regulate the output quantity $U_O$ 336. A sense circuit 338 is coupled to sense the output quantity $U_O$ 336 and to provide feedback signal $U_{FB}$ 340, which is representative of the output quantity $U_O$ 336. Feedback signal $U_{FB}$ 340 may be a voltage signal or a current signal. In one example, the sense circuit 338 may sense the output quantity $U_O$ 336 from an additional winding included in the energy transfer element T1 320. In another example, there may be a galvanic isolation (not shown) between the controller 342 and the sense circuit 336. The galvanic isolation is implemented by using devices such as an opto-coupler, a capacitor, a magnetic coupling, or the like.

Controller 342 is coupled to the sense circuit 338 and receives the feedback signal $U_{FB}$ 340 from the sense circuit 338. In addition, the controller 342 provides drive signal 350 to the switch S1 352 to control various switching parameters to control the transfer of energy from the input of power converter 300 to the output of power converter 300. Examples of such parameters may include switching frequency, switching period, duty cycle, or respective ON and OFF times of the power switch S1 352.

Although a single controller is illustrated in FIG. 3, it should be appreciated that in other examples, power converter 300 may utilize multiple controllers to regulate the transfer of energy from the input to the output of power converter 300. For example, the power converter 300 may include a primary controller coupled to the input side of the power converter 300 and a secondary controller coupled to the output side of the power converter 300. The primary controller and secondary controller may send information through a communication link, such as magnetic coupling.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

What is claimed is:

1. Energy transfer element circuitry for use in a power converter, comprising:
    a cancellation shield winding wound around an energy transfer element core;
    a first trimming capacitor coupled to a first end of the cancellation shield winding to adjust a shield response of the cancellation shield winding, wherein a second end of the cancellation shield winding is unconnected, wherein a first end of the first trimming capacitor is coupled to a first input supply rail of a power converter, and wherein a second end of the first trimming capacitor is coupled to the first end of the cancellation shield winding;
    a primary winding wound around the energy transfer element core;
    a balance shield winding wound around the energy transfer element core;
    a second trimming capacitor coupled to a second end of the balance shield winding to adjust a shield response of the balance shield winding, wherein a first end of the balance shield winding is unconnected, wherein a second end of the second trimming capacitor is coupled to a second input supply rail of the power converter, and wherein a first end of the second trimming capacitor is coupled to the second end of the balance shield winding; and
    a secondary winding wound around the energy transfer element core.

2. The energy transfer element circuitry of claim 1, wherein a first end of the primary winding is coupled to a first input supply rail of a power converter, wherein a second end of the primary winding is coupled to a switch of the power converter.

3. The energy transfer element circuitry of claim 1, wherein a first end of the secondary winding is coupled to an output rectifier of a power converter, wherein a second end of the secondary winding is coupled to an output return of the power converter.

4. The energy transfer element circuitry of claim 1, wherein the primary winding is wound around the energy transfer element core over the cancellation shield winding.

5. The energy transfer element circuitry of claim 4, wherein the balance shield winding is wound around the energy transfer element core over the primary winding.

6. The energy transfer element circuitry of claim 5, wherein the balance shield winding comprises copper foil wound over the primary winding.

7. The energy transfer element circuitry of claim 5, wherein the balance shield winding comprises magnet wire wound over the primary winding.

8. The energy transfer element circuitry of claim 5, wherein the secondary winding is wound around the energy transfer element core over the balance shield winding.

9. The energy transfer element circuitry of claim 8, wherein each layer of the cancellation shield winding, the primary winding, the balance shield winding, and the secondary winding are separated from each other with tape layers.

10. The energy transfer element circuitry of claim 1, wherein the first trimming capacitor is coupled to enhance an effect of the cancellation shield winding, and wherein the second trimming capacitor is coupled to enhance an effect of the balance shield winding.

11. The energy transfer element circuitry of claim 1, wherein the first trimming capacitor is coupled between the cancellation shield winding and the primary winding.

12. The energy transfer element circuitry of claim 1, wherein when current flows through the energy transfer element circuitry, the cancellation shield winding produces an electrostatic field with an opposite polarity as a net electric field produced by the primary winding, the balance shield winding, and the secondary winding.

13. A power converter, comprising:
energy transfer element circuitry coupled between an input and an output of the power converter, wherein the input of the power converter includes first and second input supply rails, the energy transfer element circuitry including:
a cancellation shield winding wound around an energy transfer element core;
a first trimming capacitor coupled to a first end of the cancellation shield winding to adjust a shield response of the cancellation shield winding, wherein a second end of the cancellation shield winding is unconnected, wherein a first end of the first trimming capacitor is coupled to the first input supply rail, and wherein a second end of the first trimming capacitor is coupled to the first end of the cancellation shield winding;
a primary winding wound around the energy transfer element core;
a balance shield winding wound around the energy transfer element core;
a second trimming capacitor coupled to a second end of the balance shield winding to adjust a shield response of the balance shield winding, wherein a first end of the balance shield winding is unconnected, wherein a second end of the second trimming capacitor is coupled to the second input supply rail, and wherein a first end of the second trimming capacitor is coupled to the second end of the cancellation shield winding; and
a secondary winding wound around the energy transfer element core;
a switch coupled to the primary winding; and
a controller coupled to control switching of the switch to regulate a transfer of energy from the input of the power converter to the output of the power converter in response to a feedback signal representative of the output of the power converter.

14. The power converter of claim 13, wherein a first end of the primary winding is coupled to the first input supply rail, wherein a second end of the primary winding is coupled to the switch.

15. The power converter of claim 13, further comprising:
an output rectifier coupled to a first end of the secondary winding;
an output return coupled to a second of the secondary winding; and
an output capacitor coupled to the output rectifier and the output return.

16. The power converter of claim 13, wherein the balance shield winding comprises copper foil wound over the primary winding.

17. The power converter of claim 13, wherein the balance shield winding comprises magnet wire wound over the primary winding.

18. The power converter of claim 13, wherein each layer of the cancellation shield winding, the primary winding, the balance shield winding, and the secondary winding are separated from each other with tape layers.

19. The power converter of claim 13, wherein the first trimming capacitor is coupled to enhance an effect of the cancellation shield winding, and wherein the second trimming capacitor is coupled to enhance an effect of the balance shield winding.

* * * * *